(12) United States Patent
Candelore et al.

(10) Patent No.: US 7,929,831 B2
(45) Date of Patent: Apr. 19, 2011

(54) VIDEO RECORDING

(75) Inventors: Brant L. Candelore, San Diego, CA (US); Robert L. Hardacker, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1159 days.

(21) Appl. No.: 11/639,856

(22) Filed: Dec. 15, 2006

(65) Prior Publication Data
US 2008/0145023 A1 Jun. 19, 2008

(51) Int. Cl.
*H04N 5/76* (2006.01)
*H04N 5/84* (2006.01)
(52) U.S. Cl. ........................... 386/291; 386/334
(58) Field of Classification Search .................. 386/291, 386/326, 327, 329, 334, 201, 232
See application file for complete search history.

(56) References Cited

U.S. PATENT DOCUMENTS
2005/0264698 A1* 12/2005 Eshleman ..................... 348/565

FOREIGN PATENT DOCUMENTS
| JP | 2000-101958 | 4/2000 |
| JP | 2000-195243 | 7/2000 |
| JP | 2003/179855 A * | 6/2003 |

* cited by examiner

*Primary Examiner* — Robert Chevalier
(74) *Attorney, Agent, or Firm* — Miller Patent Services; Jerry A. Miller

(57) ABSTRACT

A recording method consistent with certain embodiments involves monitoring an output from a video source for video signals encoded in a first format; detecting a frame synchronization signal in the video signal; and responsive to detecting the frame synchronization signal in the video, beginning a recording process. This abstract is not to be considered limiting, since other embodiments may deviate from the features described in this abstract.

16 Claims, 2 Drawing Sheets

VIDEO RECORDING

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Audio video (A/V) streams of content can be produced using a variety of analog and digital formats. In order to play content on a variety of devices, including newly devised portable devices, encoding, transcoding, or transrating is used to change from one format to another.

Normally, a recording device has its own user interface, and each such recording device has its own interface for determining what content will be recorded. The result is often a combination of interfaces that a user must navigate to accomplish a recording operation. If encoding, transcoding or transrating is required, the complexity of accomplishing the recording process can increase dramatically.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
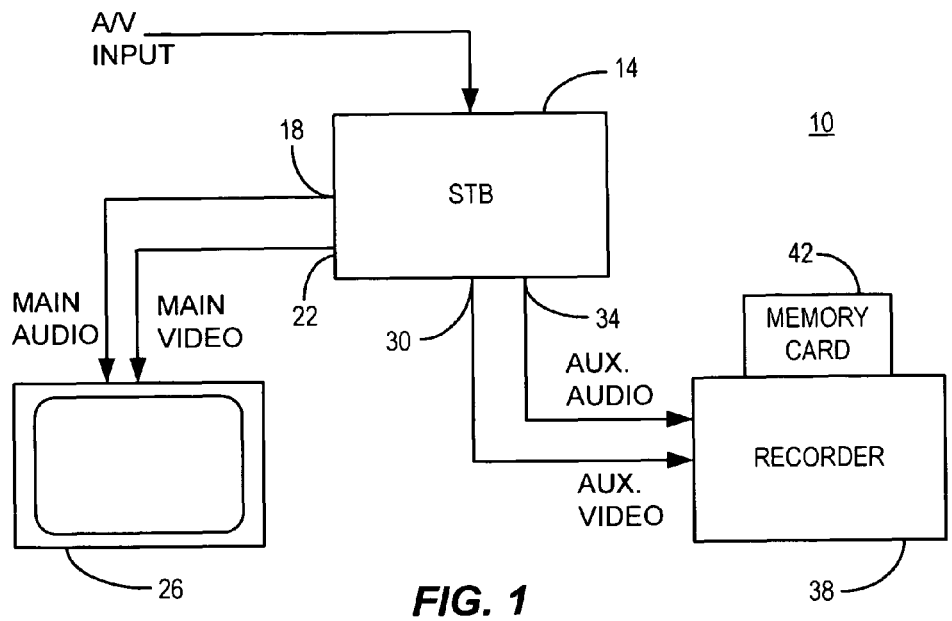
FIG. 1 illustrates a block diagram of an example recording system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "transrate" is intended to mean a change in the bit rate either up or down. This is associated with a change in resolution, e.g. the number of pixels rendered is reduced to accommodate a smaller screen on a portable device, or the content is "down-res'ed" which effectively lowers the information content for the same number of pixels.

The term "encoding" is intended to mean compression of baseband digital content, such as BT.656 and BT.861, using a codec such as MPEG2, AVC or VC1.

The term "transcoding" is intended to mean conversion from one codec to another whereby the compressed content is not entirely decoded, but then re-encoded in the other codec format. However, it is noted that the term "transcoding" has been and can be used generically to encompass both direct digital to digital transcoding as well as transcoding that involves an intermediate conversion to baseband digital content and then re-encoding. Additionally, transcoding has been and can be used to refer to processes that also incorporate functions such as transrating. When the term is used in isolation, it can encompass any of these meanings.

The term removable electronic recording medium is intended to mean a medium that is in normal use installed and removed by a user such as a recordable disc (CD, DVD, Zip™, etc:), an EEPROM device such as a Memory Stick®, SD™ memory, XD® memory, etc.), or USB mass storage devices.

In accordance with certain embodiments consistent with the present invention, existing, un-modified, set top boxes and television sets with outputs tied to active programming can be used to source content to an external recording device (assuming that if any copy protection is used, that copying is allowed). If the source content is analog, it should first to be digitized by the recording device. If the content is uncompressed digital, e.g. from DVI, HDMI, SDI or video port, or digitized analog (from the previous digitization of analog step), the content may be recorded "as is" or compressed using a codec such as MPEG2, AVC, or VC1 which is much more efficient with storage. Portable players often can only playback content of a certain codec type. If the source content is already compressed it may be received by the device as packets such as MPEG2 Transport Stream (TS) packets or Internet Protocol (IP) packets, and it may be transcoded by the device, for example from MPEG2 to AVC or VC1. The external device can be set up to receive the content "as is" or, possibly digitize, compress, transrate and transcode content, based upon whether or not analog or digital frame sync, or in the case of compressed content, packet sync is detected from the output. In other words, the recording device starts recording whenever the output is "live". Such an embodiment allows recording without need for metadata or a more formal protocol between the set top box, television (or other receiver device) and the external recording device.

Certain embodiments, therefore, support the automated, external recording of content using existing hardware with minimal overhead or modifications to the sourcing device, e.g. TV or set-top box. and minimizes the time to transfer content to an external device since the recording by the external device can occur as the content is receive over the A/V input. Such recording may be effected by recording a digitally encoded, transcoded or transrated version of the content.

Some set-top boxes have recording output connections which are tied to the "active channel" being viewed but are prevented from displaying any onscreen display (OSD) such as from menus used for navigation and control to allow for a "clean" recording. A recording output can be used to drive a recorder that is enabled when sync is detected.

Detection of sync is readily accomplished for analog outputs. Circuits for accomplishing such are well known and need not be disclosed in detail. In uncompressed digital video, such as BT.656, BT.861, etc. also have readily detectable horizontal and vertical syncs. In compressed digital video, content is delivered in packets., e.g MPEG (Moving Pictures Expert Group) Transport Stream or Internet Protocol (IP) packets. MPEG Transport Packets have headers marked by the "47" hex byte code. If the "47" hex byte code is found 188 bytes apart, it can be assumed that sync has been achieved.

Turning now to FIG. 1, a general recording system consistent with certain embodiments of the present invention is depicted as system 10. In this example system, a television set top box or other television receiver device 14 receives an audio/video (A-V) input signal or otherwise receives an input signal that is recorded according to embodiments of the invention. In this embodiment, set top box 14 has a pair of outputs 18 and 22, which supply main audio and main video to a display device 26 for display to the user. A set of auxiliary outputs 30 and 34, which can preferably be programmed to provide an output under program circumstances (such as time or for a particular program), provides an auxiliary video and audio output respectively to a recorder device 38 consistent with embodiments of the present invention. Preferably, the outputs 30 and 34 have no OSD content, but this should not be considered limiting. Also, output 30 does not have analog copy protection e.g. such as that provided by Macrovision™, applied or the copy protection allows for copying.

In this embodiment, recorder device 38 utilizes a memory card 42 that serves as a storage location for the audio/video content. In accordance with certain embodiments, the memory card 42 may be realized in the form of a stick-type memory, such as a Sony Memory Stick® stick style memory or other similar electronic storage medium such as those commonly used with digital cameras and the like. However, this is not to be considered limiting since any suitable recording media can be utilized, including both removable and permanent media.

In accordance with certain embodiments, the recorder is devised as a simple recording device that may not only record audio/video content, but may scale the content to a resolution more suitable for display on another medium other than a television display. In still another embodiment the recorder may encode uncompressed video or transcode already compressed video content the content to a format more suitable for display on another medium besides a television display. By way of example and not limitation, such display may be a game console display, personal digital assistant display, or telephone display without limitation.

Note that this content may be analog as in FIG. 1. In that case it may be recorded as analog or digitized and recorded either uncompressed or digitize it, compress it and record it. If the content is already compressed digitally it may be desired to transcode to a more convenient compression algorithm either for better efficiency or because the targeted playback device supports it. In any of these cases the content may be scaled based upon the intended playback device. For example MP2 HD content that is planned to be played back onto a cell phone could be decoded, scaled, and re-encoded to AVC. Alternately if the AVC codec supported encoding HD, the content might well be re-encoded as HD but to a reduced resolution—this being a technical performance issue.

Figure 2:
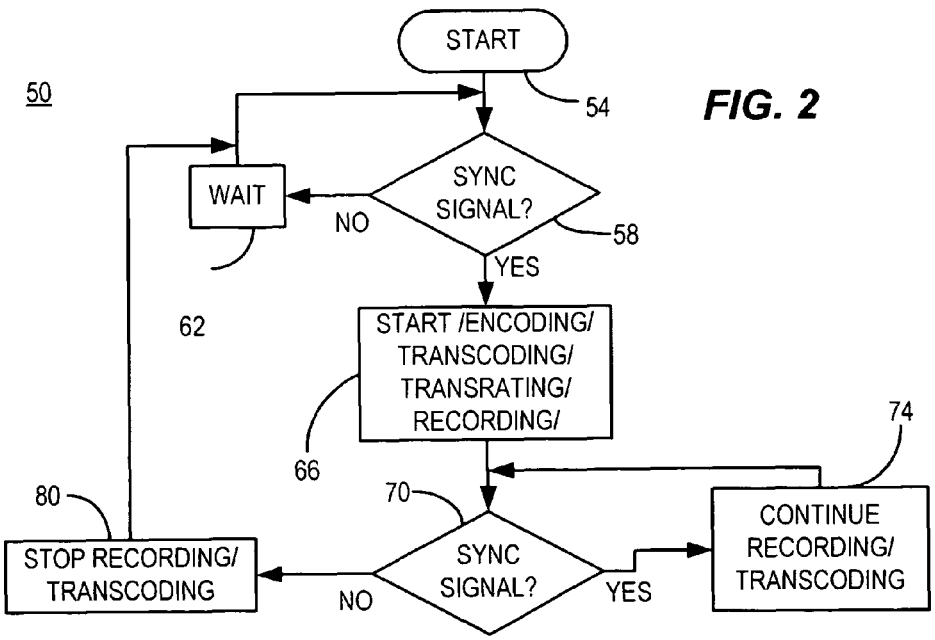
FIG. 2 is a flow chart depicting an example recording process consistent with certain embodiments of the present invention.

In order to facilitate simplicity of design and versatility of use, the recorder 38 advantageously utilizes the presence of a synchronization signal as a directive to start recording. A process utilized in this manner is depicted as process 50 of FIG. 2, starting at 54. At 58, the recorder device 38 monitors the video input signal from 30 for presence of a synchronization signal. The recorder 38 waits at 62 until such a frame synchronization signal is detected. Once detected, the recorder 38 commences recording (and potentially transcoding) at 66.

During the digitization, encoding, transcoding, transrating and/or recording process, the recorder device 38 continually monitors the incoming video signal for the presence of a synchronization signal at periodic intervals at 70. So long as that signal is present, the recording continues at 74. However, when at 70 the recorder device detects that a frame synchronization signal has been absent for a prescribed period of time, it can be safely assumed that the video signal has ceased, and the recorder device 38 ceases recording at 80 (and transcoding of the recorder device is also serving a transcoding function). Control then returns to 58 to await receipt of a new synchronization signal.

Figure 3:
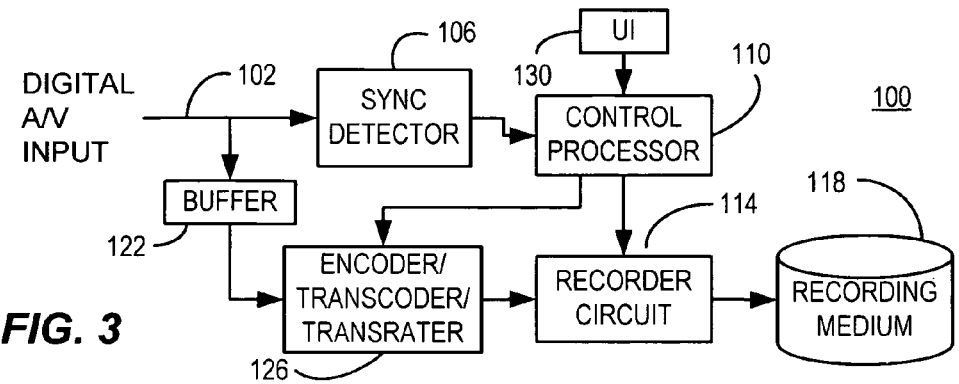
FIG. 3 is a block diagram of one example embodiment of a recording device consistent with certain embodiments of the present invention.
Figure 4:
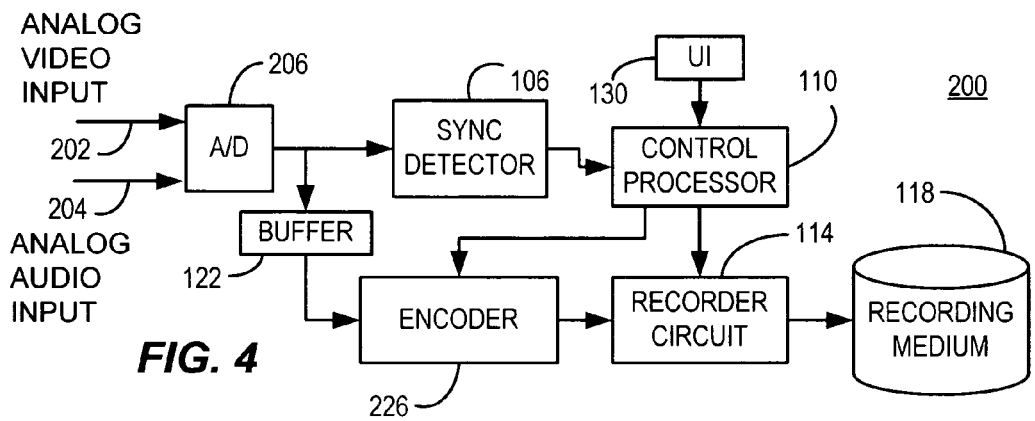
FIG. 4 is a block diagram of another example embodiment of a recording device consistent with certain embodiments of the present invention.
Figure 5:
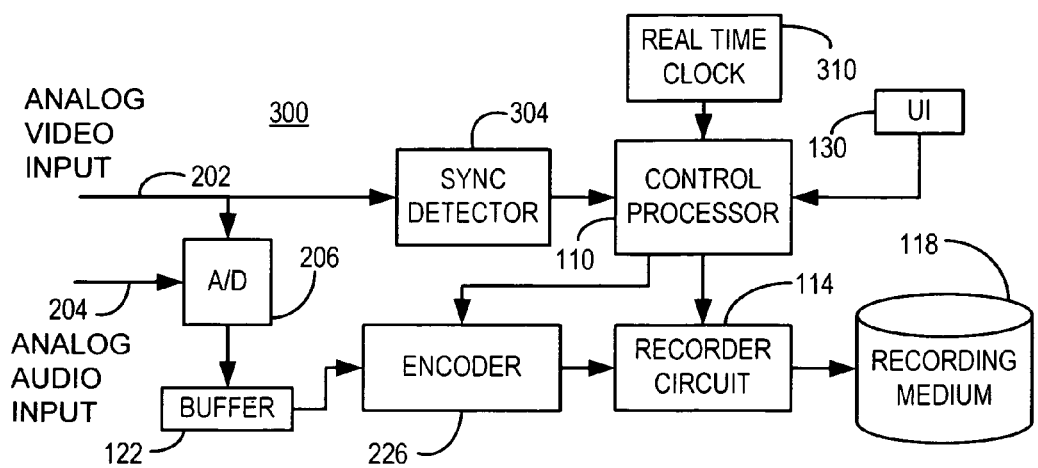
FIG. 5 is a block diagram of another example embodiment of a recording device consistent with certain embodiments of the present invention.

By such use of a synchronization signal to turn the recording process on and off, the recording device can be used in a wide variety of versatile environments and can have minimal cost. Three embodiments of the recording device 38 are depicted in FIGS. 3 through FIG. 5 as embodiments 100, 200, and 300 respectively. However, those skilled in the art will appreciate upon consideration of the present teachings that a hybrid device utilizing functions from several of these embodiments can be combined into a single unit for recording both analog and digital video input signals. In embodiment 100 of FIG. 3, the device is configured as a digital input device. In this embodiment, a digital video input signal is received at 102, which incorporates packets of video and audio content in a combined stream and enters the device at 102. Synch detector monitors the signal at 102 to determine when synchronization signal has been received.

Upon receipt of such a synchronization signal at 106, the synch detector alerts control processor 110 that recording is to commence. A new file can be opened to receive the content. The file can be named by its time of creation if no other metadata is available. Control processor 110 then alerts transcoder 126 to begin transcoding (assuming that a transcoding function is to be implemented), and recorder 114 to begin recording to recording media 118. In certain embodiments, a short buffer 122 may be utilized to buffer several bits, bytes, or packets of the signal so that once transcoding and recording commences, no data will be lost during the time of initial synchronization detection by synch detector 106. In certain embodiments, a user interface such as 130 can be provided which can be used, for example, to select a format for the transcoding operation. This might be a simple UI such as by selecting "PSP" (Playstation Portable™) as target the appropriate parameters are selected to for the correct resolution, audio and video codecs. For example, conversion from HD to SD video, or conversion to a lower resolution (e.g. 1/16 or 1/32 for display on a smaller screen) can be selected.

Embodiment 100 is a purely digital realization of a recorder consistent with certain embodiments of the present invention. However, an analog embodiment is also contemplated in embodiments 200 and 300. In embodiment 200 of FIG. 4, an analog video input 202 is supplied to an analog-to-digital converter 206 (and may also be encoded, e.g., as MPEG video). In addition, an analog audio input is supplied to an analog-to-digital converter 206 (which may in fact be realized by multiple analog-to-digital converters). The analog audio and video signals are converted to digital at 206, and the remainder of the operation of circuit 200 is similar to that depicted in FIG. 3, except that the digital output of 122 is encoded at encoder 226 to appropriately encode the digitized signal for the desired target, with the digital video input 102 being equivalent to the output of the analog-to-digital converter, presuming that the output at 102 is unencoded. It is noted, however, that analog-to-digital converter 206 of FIG. 4 may also incorporate data encoding functions in order for synch detector 106 to detect a frame synchronization signal in the same manner as that of embodiment 100. Thus, encoding can take place at 206 and transcoding and/or transrating functions can take place at encoder 226.

Embodiment 300 of FIG. 5 operates in a manner similar to that of embodiment 200, except that the analog video input signal 202 is provided to a synchronization detector 304 that operates in the analog domain. The analog video input 202 and the analog audio input 204 are similarly converted to digital at 206 (and possibly encoded, for example into an MPEG format). The digitally encoded data are then supplied to buffer 122 and in turn to encoder 226, and the operation is similar to that of embodiments 100 and 200 from this point in the processing forward. The embodiment 300 as shown has a real-time clock such as 310 of device 300, so that recorded content can be provided with a time stamp.

Once the data has been encoded, transcoded, or transrated and then recorded to a recording medium 118, which may be a disc or solid state recording medium, the recording medium can then be transferred to an appropriate player device, such as a game console, computer, cellular telephone, video player, or television set top box, or merely stored for later use. Since the device is controlled by the presence or absence of video synchronization, it takes advantage of the user interface that is already in place for the video source and can therefore be realized in a cost effective manner.

Sync detection prevents the need for 1) manual operation to cause a recording or transcoding on the external device; 2) a separate timer in the external recording/transcoding device (although real-time clock might be used to "timestamp" when a recording was made in lieu of other metadata such as the program name); or 3) Communication channel between the source (the TV or STB & content) and the sink (the recording device).

The recording device can thus be used with existing set-top boxes/TVs and other television devices, especially those that have timers to auto-tune to a specific program. These allow the unattended external recording/transcoding of content. It also could allow continuous recording of any "active program" content being viewed. The user could then go through later and cull the programs that are of no interest.

If the source output is compressed, the recording device can incorporate a transcoder or transrater as disclosed that automatically detects the type of incoming video and transcodes or transrates it to a more efficient coding (such as AVC) for storage, or transcodes the incoming video to a the appropriate compression method for playback by other devices (i.e. MP2 is transformed to MP4 at a reduced resolution and bitrate for playback on a Sony PlayStation Personal™, or a to a Personal Computer (PC) which can record images from a security camera that may or may not be on-line.

Many enhancements can be devised for the recording device, as will be appreciated by those skilled in the art upon consideration of the present teachings. For example, the recording device might be able to tell what frequency the tuner of the source was tuned to. Typically the user does not care for this information however, it might allow for added information when recording a television program . . . that it came from Group 1 . . . Group 30, etc. programs—with the groups representing channel frequencies. The external recording device might also capture a thumbnail picture of the video content in order to represent the recording to the user later so that the user might be reminded about what it was about. Such enhancements do not require an established protocol between the set-top box/TV and the external recording device.

In other embodiments, a simple protocol can be devised to allow the content to be recorded by name, channel, and length of time. This protocol might also control the external recording in the first place. However, the simplicity of using frame sync detection as taught above is that no protocol is really needed. Many variations will occur to those skilled in the art upon consideration of the present teachings. In one such variation, in addition to or instead of the recording and transcoding functions, the transcoded or recorded signal can be output into a home network (some other device will record or transcode it).

Those skilled in the art will recognize, upon consideration of the above teachings, that certain of the above exemplary embodiments are based upon use of a programmed processor 110, in part operating according to process 50. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Thus, a recording method consistent with certain embodiments involves monitoring an output from a video source for video signals encoded in a first format; detecting a frame synchronization signal in the video signal; and responsive to detecting the frame synchronization signal in the video, beginning a recording process.

In certain embodiments, the recording process stores a representation of the video signal on an electronic recording medium In certain embodiments, the recording process involves transcoding the video signal to a transcoded format that is different than the first format and recording the video in the transcoded format to an electronic recording medium. In certain embodiments, the transcoded format comprises a format having lower resolution than the first format. In certain embodiments, the first format comprises an analog format and the frame synchronization signal is an analog frame synchronization signal, and further converting the analog format to a digital format and transcoding the digital format to a lower resolution digital format. In certain embodiments, the first format is an analog format and the frame synchronization signal is an analog frame synchronization signal. In certain embodiments, the electronic recording medium comprises a removable electronic recording medium.

In certain embodiments, a recording device has an input that receives a video input signal encoded in a first format. A frame synchronization detector detects a frame synchronization signal in the video signal. A recorder, responsive to detecting the frame synchronization signal in the video begins a recording process.

The recording process can involve storing a representation of the video signal on an electronic recording medium. The recording device can further have a encoder or transcoder that encodes or transcodes the video signal to-an encoded or transcoded format that is different than the first format, and the recording process involves recording the video in the encoded or transcoded format to an electronic recording medium. In certain embodiments, the encoded or transcoded format comprises a format having lower resolution than the first format. The frame synchronization signal can be either analog or digital.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A recording method, comprising:
monitoring an output from a video source for video signals encoded in a first format;
detecting a frame synchronization signal in the video signal;
responsive to detecting the frame synchronization signal, transrating and encoding the video signal into a lower resolution digital video signal having a reduced bit rate that is matched to a selected video screen size in number of pixels associated with a selected target portable device; and
responsive to detecting the frame synchronization signal in the video signal, beginning a recording process to record the transrated and encoded digital video to an electronic recording medium;
where the selected video screen size is selected from a user interface by selecting a name of the selected target portable player device.

2. The method according to claim 1, wherein the first format comprises an analog format and wherein the frame synchronization signal comprises an analog frame synchronization signal.

3. The method according to claim 1, wherein the electronic recording medium comprises a removable electronic recording medium.

4. The method according to claim 1, wherein the first format comprises an analog format and wherein the frame synchronization signal comprises an analog frame synchronization signal.

5. A recording device, comprising:
an input that receives a video input signal encoded in a first format;

a frame synchronization detector that detects a frame synchronization signal in the video signal;

a transrater and encoder that, responsive to detecting the frame synchronization signal, transrates and encodes the video signal into a lower resolution digital video signal having a reduced bit rate that is matched to a selected video screen size in number of pixels associated with a selected target portable player device;

a recorder that, responsive to detecting the frame synchronization signal in the video, begins a recording that stores the encoded or transcoded video signal on an electronic recording medium; and a user interface, where the selected video screen size is selected from a user interface by selecting a name of the selected target portable device.

6. The device according to claim 5, wherein the first format comprises an analog format and wherein the frame synchronization signal comprises an analog frame synchronization signal.

7. The device according to claim 5, wherein the first format comprises an analog format and wherein the frame synchronization signal comprises an analog frame synchronization signal, and further comprising an analog to digital converter that converts the analog format to a digital format.

8. The device according to claim 5, wherein the electronic storage medium comprises a removable electronic storage medium.

9. The device according to claim 5, where the selected target portable device comprises a portable game console.

10. The device according to claim 5, where the selected target portable device comprises a portable cellular telephone.

11. The device according to claim 5, where the resolution of the lower resolution signal is 1/16 the resolution of the first format.

12. The device according to claim 5, where the first format comprises a digital format and further comprising transcoding the digital format to a different digital format.

13. The method according to claim 1, where the selected target portable device comprises a portable game console.

14. The method according to claim 1, where the selected target portable device comprises a portable cellular telephone.

15. The method according to claim 1, where the resolution of the lower resolution signal is 1/16 the resolution of the first format.

16. The device according to claim 1, where the first format comprises a digital format and further comprising transcoding the digital format to a different digital format.

\* \* \* \* \*